United States Patent
Liu et al.

(10) Patent No.: US 11,837,011 B2
(45) Date of Patent: Dec. 5, 2023

(54) BUTTON MODULE WITH A VIBRATION FEEDBACK AND A FINGERPRINT SENSING FUNCTION, FINGERPRINT SENSING MODULE FOR THE SAME, AND CONTROL METHOD FOR THE SAME

(71) Applicant: ELAN MICROELECTRONICS CORPORATION, Hsinchu (TW)

(72) Inventors: Nan-Jung Liu, Zhubei (TW); Tung-Ming Yang, Taoyuan (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/693,919

(22) Filed: Mar. 14, 2022

(65) Prior Publication Data

US 2022/0309822 A1   Sep. 29, 2022

(30) Foreign Application Priority Data

Mar. 26, 2021   (TW) .................................. 110111064

(51) Int. Cl.
 *G06V 40/13* (2022.01)
 *G06F 3/041* (2006.01)
 *G06F 21/32* (2013.01)
(52) U.S. Cl.
 CPC ........ *G06V 40/1306* (2022.01); *G06F 3/0416* (2013.01); *G06F 21/32* (2013.01)

(58) Field of Classification Search
 CPC ................................ G06V 40/13; G06F 21/32
 See application file for complete search history.

(56) References Cited

U.S. PATENT DOCUMENTS

2020/0193137 A1*   6/2020   Wu ........................ G06F 1/1671
2020/0293737 A1*   9/2020   Kim ........................ H10N 30/50

FOREIGN PATENT DOCUMENTS

| CN | 106468978 A | 3/2017 |
|---|---|---|
| CN | 108256393 A | 7/2018 |
| CN | 110187757 A | 8/2019 |

* cited by examiner

*Primary Examiner* — Joseph R Haley
(74) *Attorney, Agent, or Firm* — patenttm.us

(57) ABSTRACT

A button module with vibration feedback and fingerprint sensing, a fingerprint sensing module for the same, and a control method for the same are provided. The fingerprint sensing module has a fingerprint sensing unit stacked on a vibration unit. When the fingerprint sensing module detects a fingerprint, the control unit or a host of an electronic device determines whether the fingerprint is authenticated. If it is not authenticated, the vibration unit is activated, so that the user realizes that the authentication is not passed in real time through the vibration. Then the user may quickly change another finger or move the finger's position to speed up the authentication process. This can prevent users from waiting to improve user experience.

12 Claims, 10 Drawing Sheets

BUTTON MODULE WITH A VIBRATION FEEDBACK AND A FINGERPRINT SENSING FUNCTION, FINGERPRINT SENSING MODULE FOR THE SAME, AND CONTROL METHOD FOR THE SAME

CROSS-REFERENCE TO RELATED APPLICATIONS

This application is based upon and claims priority under 35 U.S.C. 119 from Taiwan Patent Application No. 110111064 filed on Mar. 26, 2021, which is hereby specifically incorporated herein by this reference thereto.

BACKGROUND OF THE INVENTION

1. Field of the Invention

The present invention relates to an electronic device, especially to a button module with a vibration feedback and a fingerprint sensing function, a fingerprint sensing module for the same, and a control method for the same.

2. Description of the Prior Arts

Due to the popularity of portable electronic devices, the probability of users bringing portable electronic devices to various occasions is greatly increased. It also increases the proportion of users storing various confidential or important information in portable electronic devices. Therefore, the user authentication mechanism of the portable electronic devices has received more and more attention. The traditional portable electronic device uses a password as a user authentication mechanism, but the password has a higher chance of being cracked or being spied on, so the protection is low. Thus, the biometric identification is gradually used as a user authentication mechanism, which is difficult to crack and cannot be stolen by plying eyes. It is gradually becoming an important accessory in the portable electronic devices. Among various biometric identification methods, the fingerprint identification is the current mainstream. A fingerprint sensor module is built in the portable electronic device to recognize the user's fingerprint, and the sensor result is used as the user authentication mechanism.

Since the portable electronic devices require light, thin, short and small features, the conventional fingerprint sensor module is integrated into one of the buttons, such as the power button, to save space. However, when the user puts his finger on the button with the conventional fingerprint sensor module, it only can be known by the display of the portable electronic device when the fingerprint authentication is passed. In other states, the user has no way of knowing whether the conventional fingerprint sensor module is recognizing the fingerprint, or whether the recognition has been completed but has not passed the authentication. After a certain period of time has elapsed, the user can finally realize that he has not passed the authentication based on the experience, and the user's time is wasted. In this case, the user spends a lot of time waiting.

SUMMARY OF THE INVENTION

To overcome the shortcomings, the present invention provides a button module with vibration feedback and fingerprint sensing to mitigate or to obviate the aforementioned problems.

In one aspect, the present invention provides a fingerprint sensing module applying for a button module having a control unit; a fingerprint sensing unit electrically connecting to the control unit; and a vibration unit electrically connecting to the control unit and disposed under the fingerprint sensing unit, wherein the fingerprint sensing unit and the vibration unit disposed on a substrate.

In one aspect, the present invention provides a button module having the fingerprint sensing module as described; a switch disposed under the vibration unit; and a keycap covering on the fingerprint sensing unit.

In one aspect, the present invention provides a control method of the fingerprint sensing module as described comprising steps of: processing a fingerprint sensing and generating a fingerprint sensing result when a finger is detected; determining whether the fingerprint sensing result passes an authentication by the control unit or a host; and controlling the vibration unit by the control unit to execute a first feedback when it is determined that the authentication is not passed.

The advantage of the present invention is that the vibration unit is overlapped and arranged under the fingerprint sensing unit in the axial direction by bending and assembling, thereby reducing the width and overall volume in the horizontal direction. Therefore, the fingerprint sensing module is easily accommodated inside the button module. In addition, the real-time feedback performed by the vibration unit allows the user to feel the feedback of the vibration unit through the fingers for the first time. To know in real time whether the authentication is passed, the user does not have to wait, and it can effectively enhance the user experience.

Other objectives, advantages and novel features of the invention will become more apparent from the following detailed description when taken in conjunction with the accompanying drawings.

DETAILED DESCRIPTION OF THE EMBODIMENTS

With reference to the attached drawings, the present invention is described by means of the embodiment(s) below where the attached drawings are simplified for illustration purposes only to illustrate the structures or methods of the present invention by describing the relationships between the components and assembly in the present invention. Therefore, the components shown in the figures are not expressed with the actual numbers, actual shapes, actual dimensions, nor with the actual ratio. Some of the dimensions or dimension ratios have been enlarged or simplified to provide a better illustration. The actual numbers, actual shapes, or actual dimension ratios can be selectively designed and disposed and the detail component layouts may be more complicated.

Figure 1:
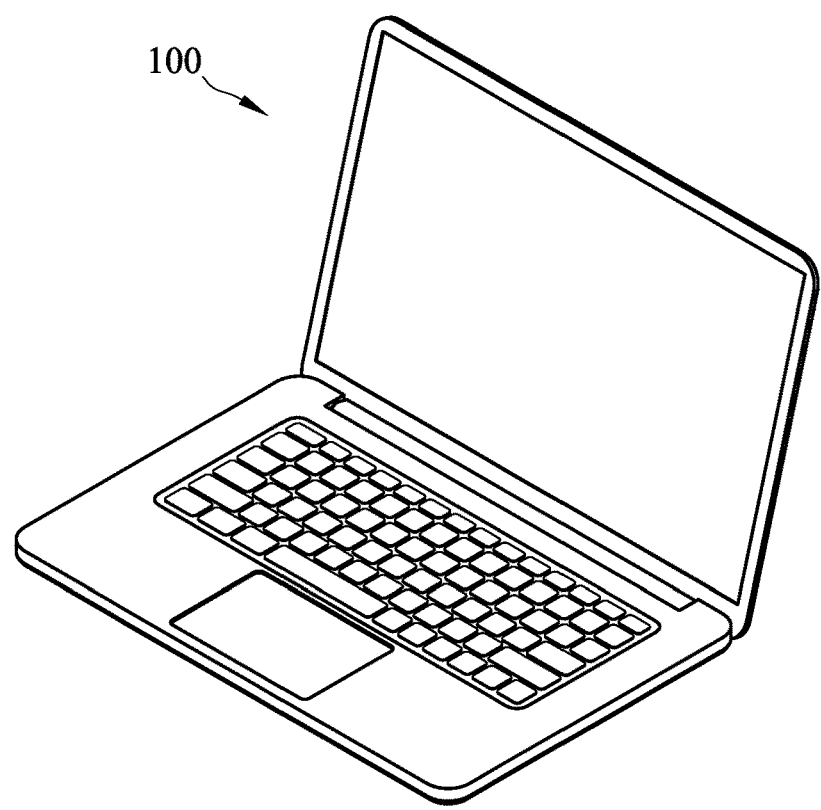
FIG. 1 is a perspective view of a portable electronic device.
Figure 2:
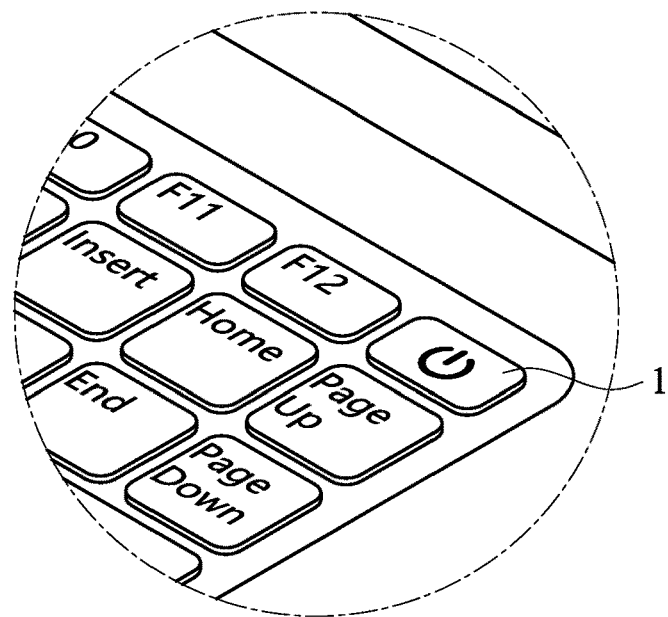
FIG. 2 is an enlarged perspective view of the portable electronic device in FIG. 1.
Figure 3:
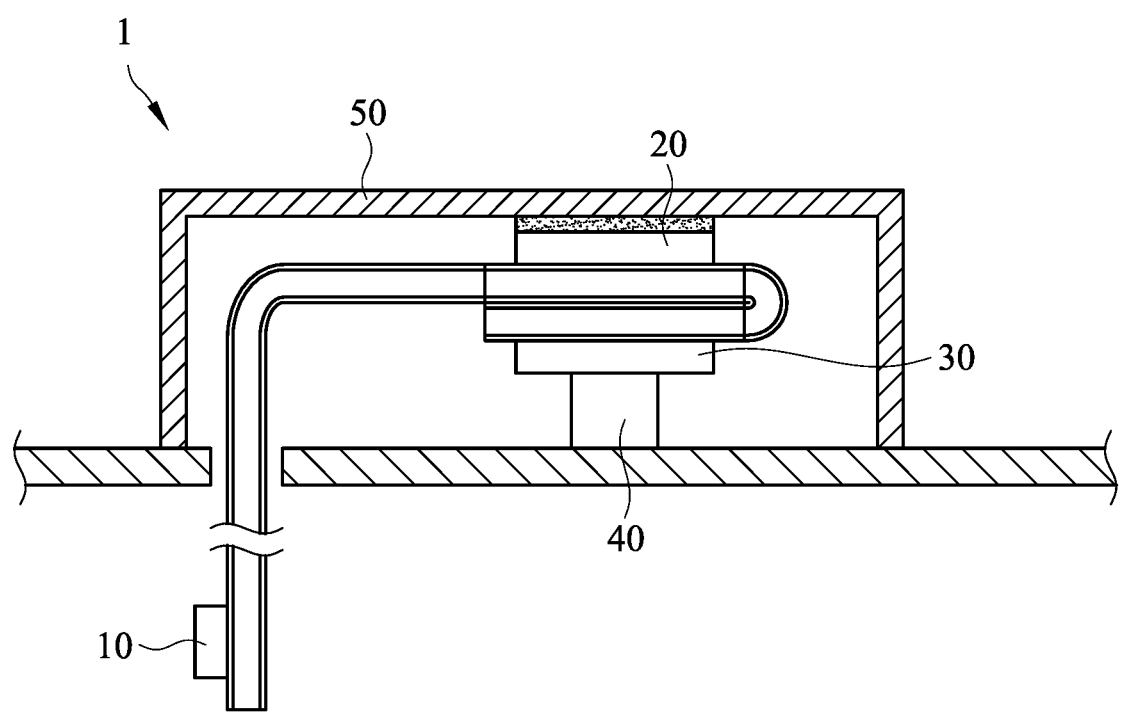
FIG. 3 is a side view in partial section of a first embodiment of a button module in accordance with the present invention.

With reference to FIGS. 1 to 4, a button module 1 with a vibration feedback and a fingerprint sensing function in accordance with the present invention is mounted in an electronic device 100 as one of the buttons of the electronic device 100. The button module 1 comprises a control unit 10, a fingerprint sensing unit 20, a vibration unit 30, a switch 40 and a keycap 50. The control unit 10, the fingerprint sensing unit 20 and the vibration unit 30 constitute a fingerprint sensing module. The fingerprint sensing unit 20 and the vibration unit 30 respectively connect to the control unit 10. The vibration unit 30 is disposed under the fingerprint sensing unit 20. The switch 40 is disposed under the vibration unit 30. The keycap 50 covers above the fingerprint sensing unit 20. An adhesive layer is disposed between the keycap 50 and the fingerprint sensing unit 20, which may be a water glue. The keycap 50 may be integrally formed, or the keycap 50 may be constituted by a preformed sidewall and a cover body. The fingerprint sensing unit 20 is used to sense the fingerprint. In one embodiment, the fingerprint sensing unit 20 has a sensing array, and the sensing array detects the capacitance change corresponding to the fingerprint to obtain a fingerprint image. In one embodiment, the vibration unit 30 is a piezoelectric element or an element with a vibration motor. When a piezoelectric element is used as the vibration unit 30, a smaller volume is obtained and the manufacturing cost is saved. In one embodiment, the vibration way of the vibration unit 30 is to vibrate up and down along the axial direction in which axis that the vibration unit 30 and the fingerprint sensing unit 20 are stacked. When the user presses down the button module 1, the switch 40 transmits a triggered message to the control unit 10 to correspondingly execute the command that should be executed when the switch 40 is triggered. As shown in FIG. 2, the button module 1 is used as a power button so that the button module 1 correspondingly executes preset instructions such as power-on, sleep, or wake-up when the switch 40 is triggered.

Figure 4:
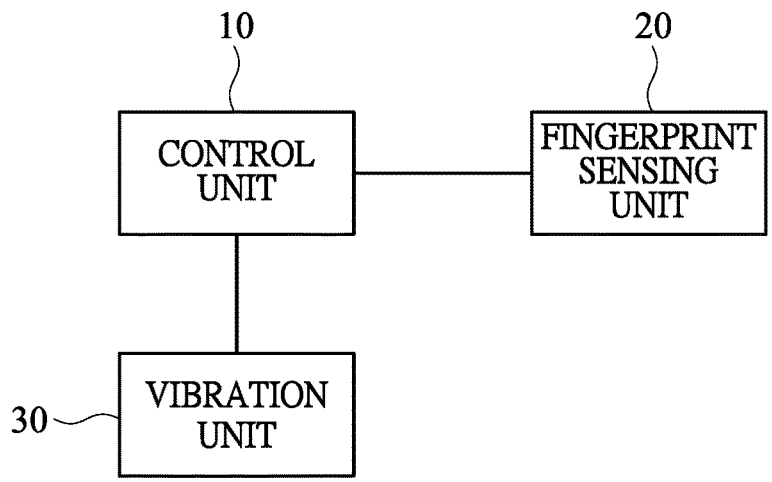
FIG. 4 is a block diagram of part of the elements of a button module in accordance with the present invention.
Figure 5:
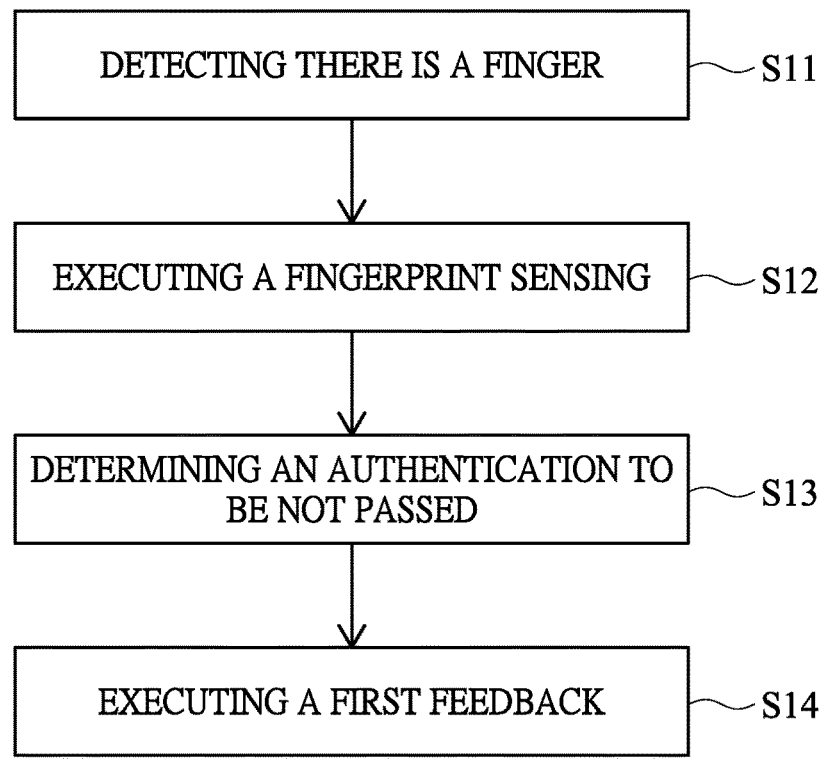
FIG. 5 is a flowchart of a first embodiment of a control method for a button module in accordance with the present invention.

With reference to FIG. 5 in view of FIGS. 1 to 4, a control method in accordance with the present invention for the button module 1 as described comprises the following steps. When a finger is detected (S11), the fingerprint sensing unit 20 starts to execute the fingerprint sensing (S12). The fingerprint sensing unit 20 transmits the obtained fingerprint image to the control unit 10 or the host of the electronic device 100 (not shown). Then the control unit 10 or the host of the electronic device 100 generates a fingerprint sensing result according to the fingerprint image. The control unit 10 or the host of the electronic device 100 determines whether the fingerprint sensing result is authenticated according to the fingerprint sensing result, that is, whether the fingerprint sensing result matches the pre-stored user fingerprint data to determine whether the fingerprint is authenticated. When it is determined that the authentication is not passed (S13), the control unit 10 controls the vibration unit 30 to perform a first feedback (S14). For example, one or several short vibrations are performed, one long vibration or several long and short vibrations constitute a combination of vibrations with special vibration frequencies are performed, etc.

Therefore, the user quickly learns that his/her fingerprint has not passed the authentication through the first feedback of the vibration unit 30, and performs fingerprint authentication again by moving the finger position or changing the finger as soon as possible, so the user does not need to waste time waiting.

Figure 6:
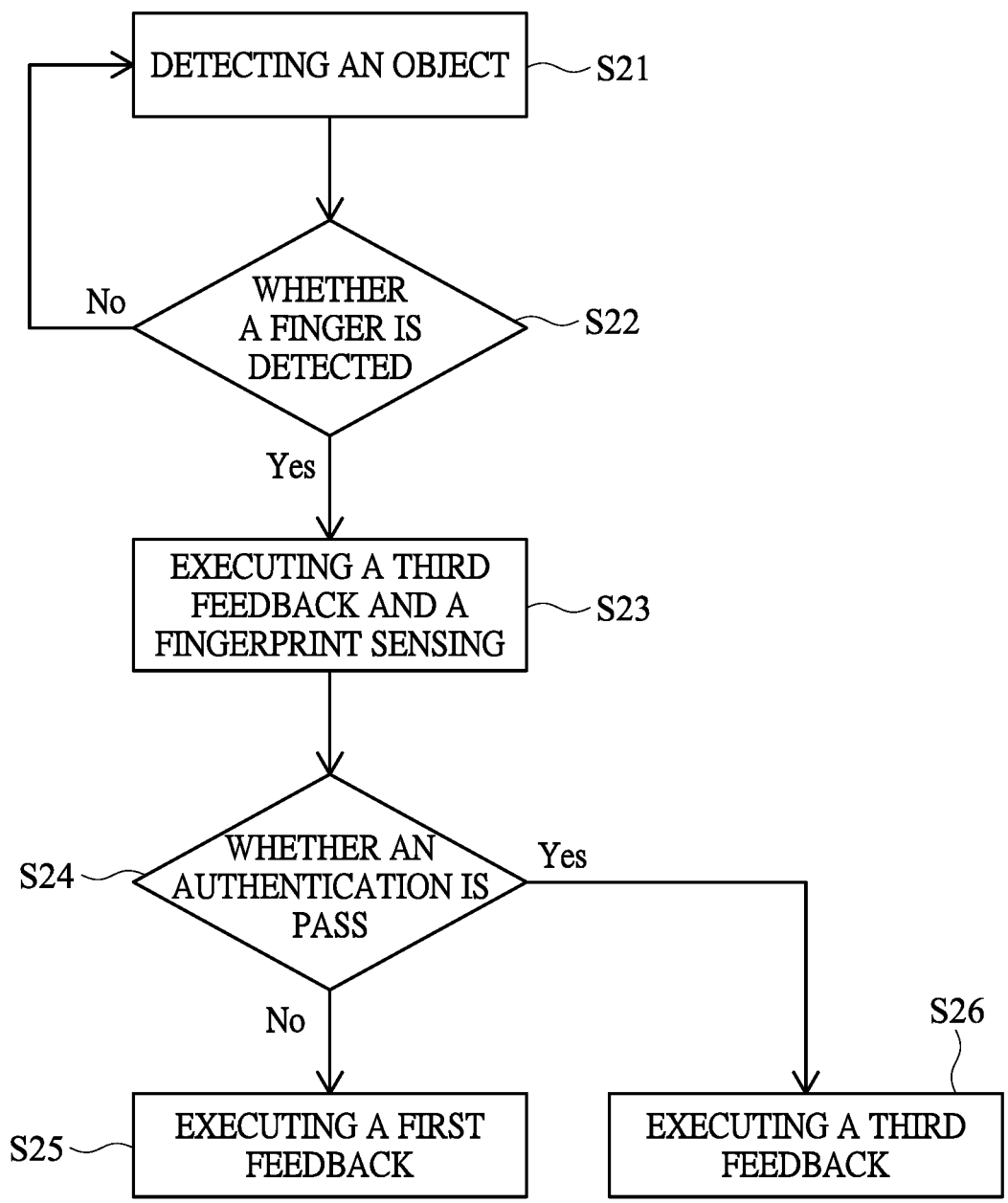
FIG. 6 is a flowchart of a second embodiment of a control method for a button module in accordance with the present invention.

In another embodiment, with reference to FIG. 6 in view of FIGS. 1 to 4, a control method in accordance with the present invention for the button module 1 as described comprises following steps. The fingerprint sensing unit 20 detects an object (S21) to determine whether a finger is detected (S22). If no finger is detected, the step S21 is kept executed. If a finger is detected, the fingerprint sensing unit 20 starts to execute the fingerprint sensing and the control unit 10 controls the vibration unit 30 to perform a third feedback (S23). Thus, the user knows that fingerprint sensing has started through the third feedback. The fingerprint sensing unit 20 transmits the obtained fingerprint image to the control unit 10 or the host of the electronic device 100 (not shown). Then the control unit 10 or the host of the electronic device 100 generates a fingerprint sensing result according to the fingerprint image. The control unit 10 or the host of the electronic device 100 determines whether the fingerprint sensing result is authenticated according to the fingerprint sensing result (S24). When it is determined that the authentication is not passed, the control unit 10 controls the vibration unit 30 to perform a first feedback (S25). When it is determined that the authentication is passed, the control unit 10 controls the vibration unit 30 to perform a second feedback (S26). The first, second and third feedbacks are different to distinguish from each other such as one or several short vibrations, one or several long vibrations, etc. Therefore, the user learns the current progress and results of fingerprint sensing through the different feedbacks from the vibration unit 30.

The specific structures of the fingerprint sensing module in accordance with the present invention have many different implementation embodiments, and a few are listed below, but it is not intended to limit the present invention.

Figure 7:
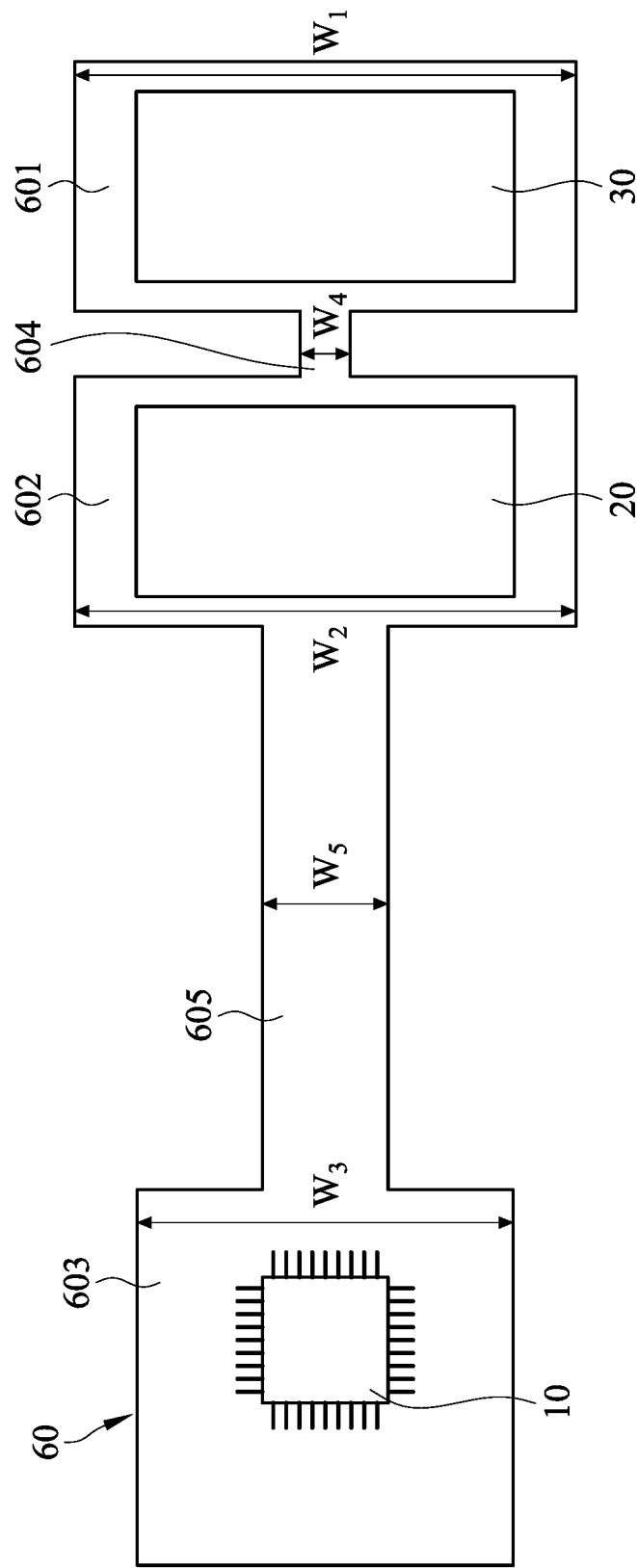
FIG. 7 is an operational top view of a first embodiment of a fingerprint sensing module in accordance with the present invention before assembled.
Figure 8:
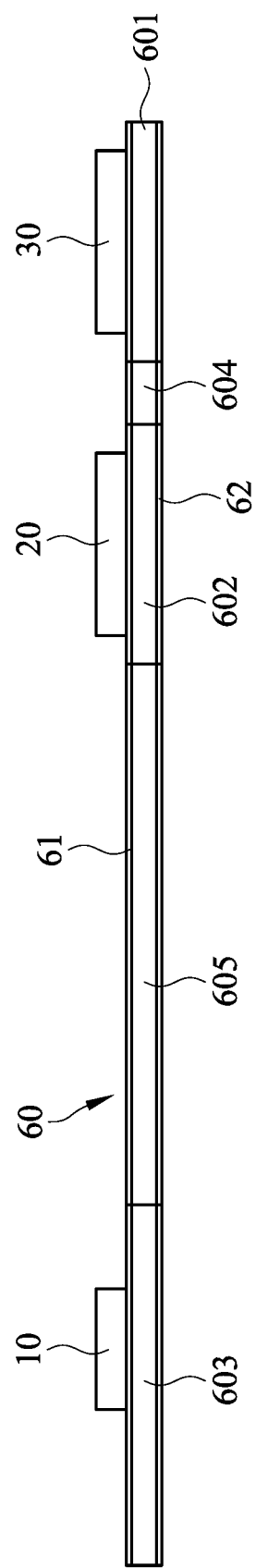
FIG. 8 is an operational side view of the fingerprint sensing module in FIG. 7 before assembled.

In one embodiment as shown in FIGS. 7 and 8, the control unit 10, the fingerprint sensing unit 20 and the vibration unit 30 are mounted on a substrate 60. The substrate 60 may be a flexible printed circuit (FPC). The substrate 60 has a first side and a second side opposing to each other. The substrate 60 has first area 601, a second area 602 and a third area 603. The second area 602 is disposed between the first area 601 and the third area 603. The first area 601 and the second area 602 are connected by a first bending part 604. The second area 602 and the third area 603 are connected by a second bending part 605. The width $W_4$ of the first bending part 604 is smaller than the width $W_1$ of the first area 601, smaller than the width $W_2$ of the second area 602, and smaller than the width $W_3$ of the third area 603. The width $W_5$ of the second bending part 605 is smaller than the width $W_1$ of the first area 601, smaller than the width $W_2$ of the second area 602, and smaller than the width $W_3$ of the third area 603. When the substrate 60 is bent, the first bending part 604 and the second bending part 605 are used as bending parts and for disposing wires. The control unit 10 is disposed on the first side at the third area 603. The fingerprint sensing unit 20 is disposed on the first side at the second area 602. The vibration unit 30 is disposed on the first side at the first area 601. In one embodiment, the fingerprint sensing unit 20 is electrically connected to the control unit 10 through a first circuit layer 61 disposed on the first side. The vibration unit 30 is electrically connected to the control unit 10 through a second circuit layer 62 disposed on the second side. In another embodiment, the fingerprint sensing unit 20 is electrically connected to the control unit 10 through the second circuit layer 62 disposed on the second side. The vibration unit 30 is electrically connected to the control unit 10 through the first circuit layer 61 disposed on the first side.

Figure 9A:
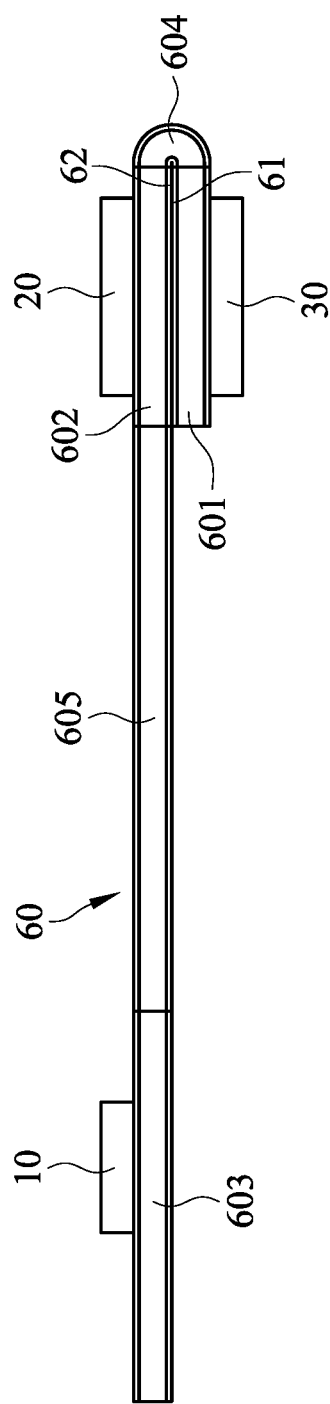
FIG. 9A is an operational side view of the fingerprint sensing module in FIG. 7 showing a first assembling example.
Figure 9B:
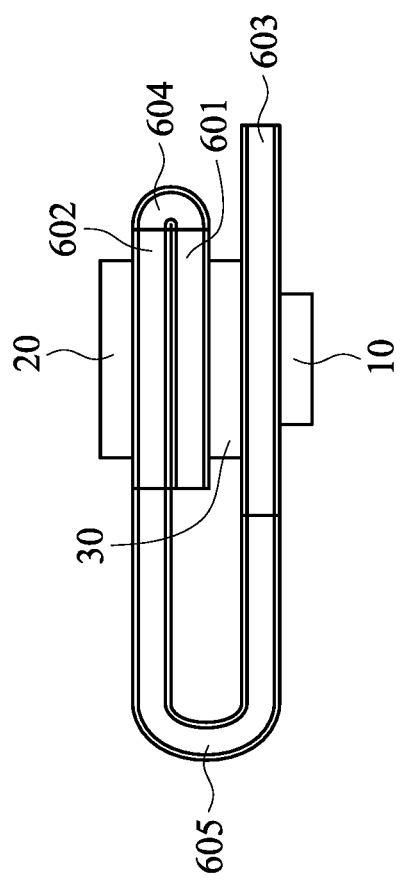
FIG. 9B is an operational side view of the fingerprint sensing module in FIG. 7 showing a second assembling example.

With reference to FIG. 9A, the first bending part 604 is bent so that the vibration unit 30 is overlapped and disposed under the fingerprint sensing unit 20 in the axial direction. A supporting element (not shown) may be provided between the second circuit layer 62 at the first area 601 and the first circuit layer 61 at the second area 602 after bending. Further, with reference to FIG. 9B, the second bending portion 605 may also be bent so that the control unit 10 is disposed below the vibration unit 30 and the fingerprint sensing unit 20. The embodiments as shown in FIGS. 9A and 9B are implemented by bending and assembling, so that the vibration unit 30 is arranged under the fingerprint sensor unit 20 in the axial direction. In this way, the width and overall volume in the horizontal direction are reduced.

Figure 10:
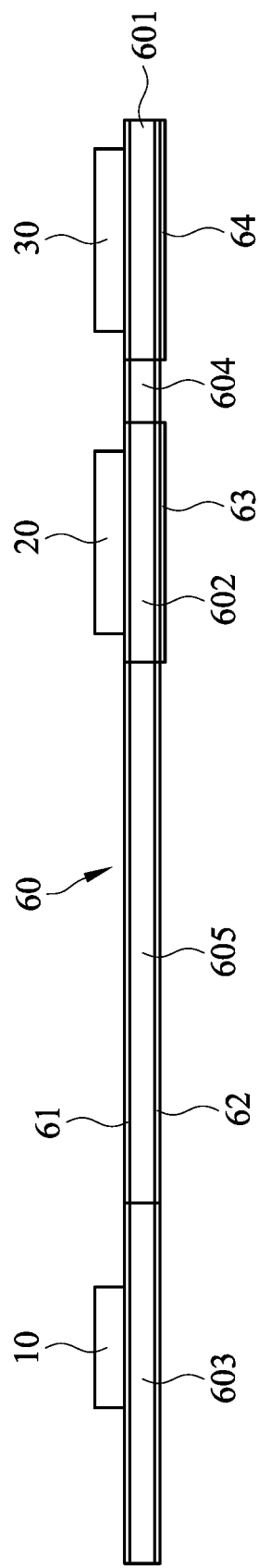
FIG. 10 is an operational side view of a second embodiment of a fingerprint sensing module in accordance with the present invention before assembled.
Figure 11:
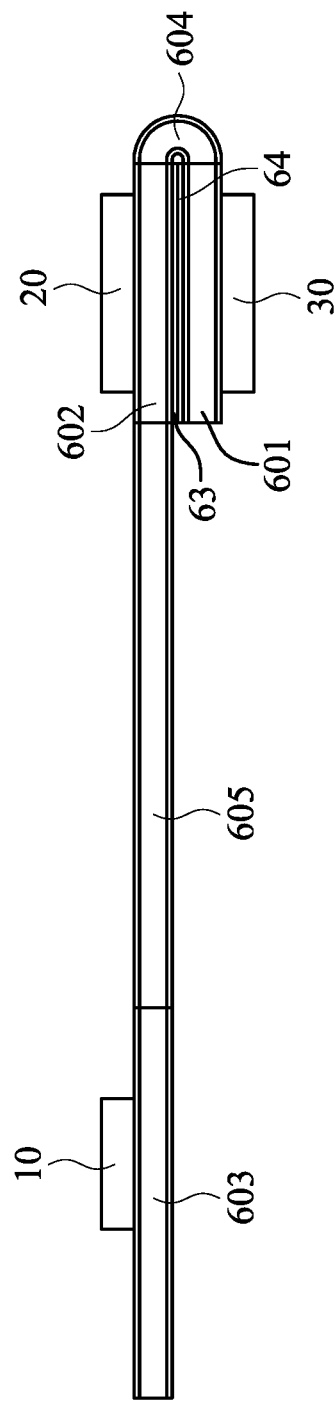
FIG. 11 is an operational side view of the fingerprint sensing module in FIG. 10 showing a first assembling example.

In one embodiment as shown in FIGS. 10 and 11, a first supporting panel 63 and a second supporting panel 64 are provided. The first supporting panel 63 is disposed on the second side at the second area 602 to correspond to the fingerprint sensing unit 20. The second supporting panel 64 is disposed on the second side at the first area 601 to correspond to the vibration unit 30. When the first bending part 604 is bent, the first supporting panel 63 abuts the second supporting panel 64 to improve the structural stability. In one embodiment, only one of the first supporting panel 63 or the second supporting panel 64 may be provided, and a supporting effect is also be provided.

Figure 12:
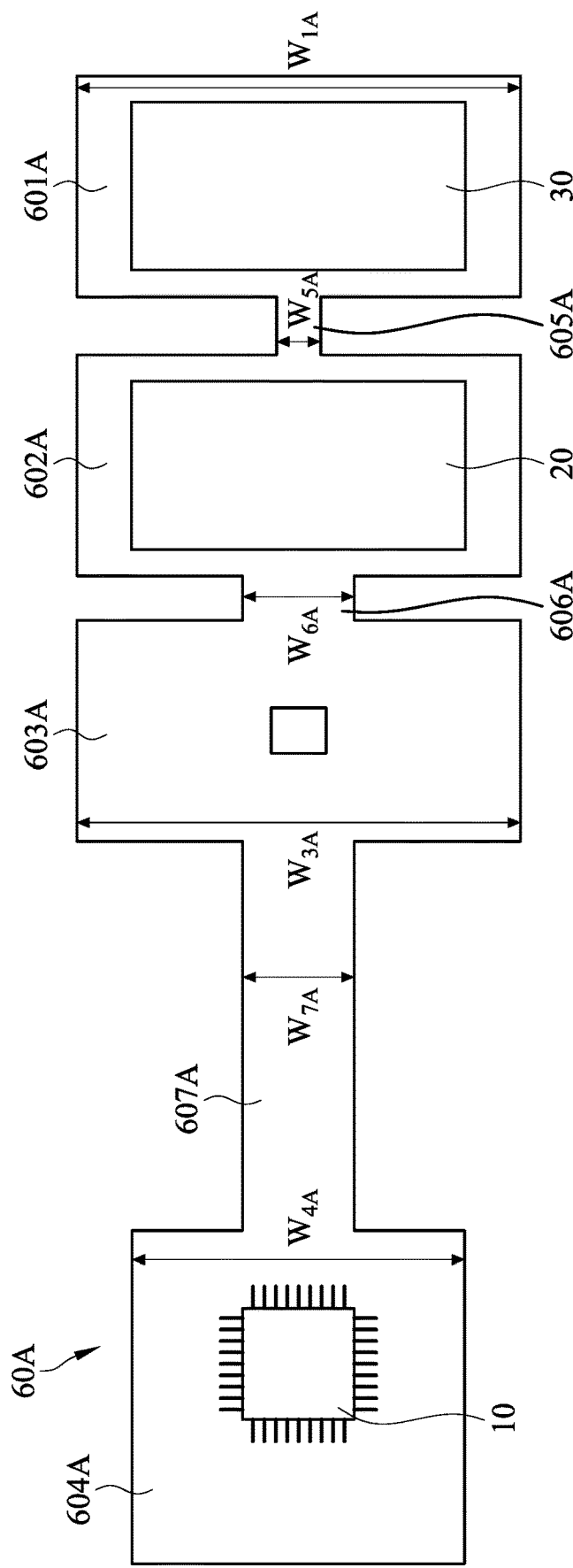
FIG. 12 is an operational top view of part of the elements of a button module in accordance with the present invention before assembled.
Figure 13:
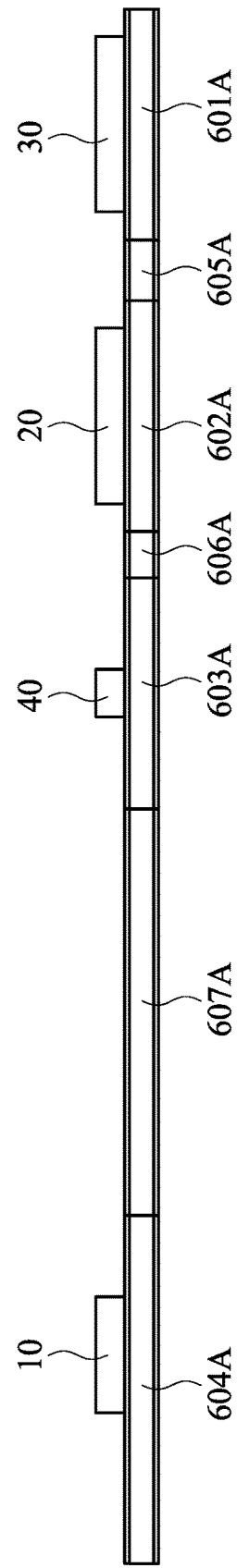
FIG. 13 is an operational side view of the button module in FIG. 12 before assembled.
Figure 14A:
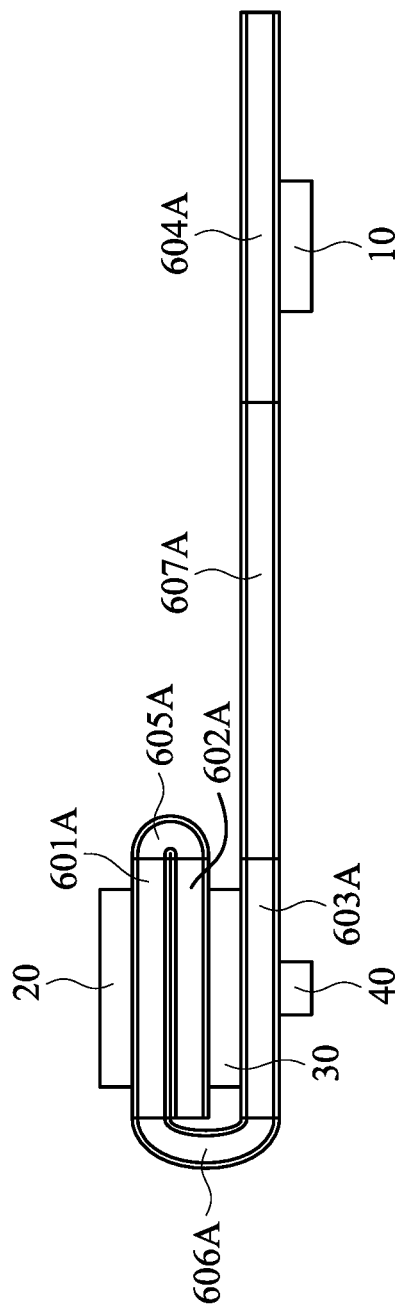
FIG. 14A is an operational side view of the button module in FIG. 12 showing a first assembling example.
Figure 14B:
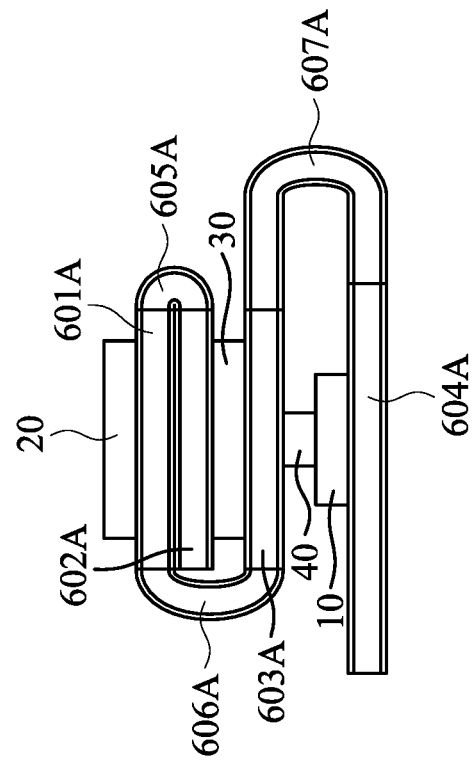
FIG. 14B is an operational side view of the button module in FIG. 12 showing a second assembling example.

In one embodiment as shown in FIGS. 12 and 13, the control unit 10, the fingerprint sensing unit 20, the vibration unit 30 and the switch 40 are mounted on a substrate 60A. The substrate 60A may be a flexible printed circuit (FPC). The substrate 60A has a first side and a second side opposing to each other. The substrate 60A has first area 601A, a second area 602A, a third area 603A and a fourth area 604A. The second area 602A is disposed between the first area 601A and the third area 603A. The third area 603A is disposed between the second area 602A and the fourth area 604A. The first area 601A and the second area 602A are connected by a first bending part 605A. The second area 602A and the third area 603A are connected by a second bending part 606A. The third area 603A and the fourth area 604A are connected by a third bending part 607A. The width $W_{5A}$ of the first bending part 605A is smaller than the width $W_{1A}$ of the first area 601A, smaller than the width $W_{2A}$ of the second area 602A, smaller than the width $W_{3A}$ of the third area 603A and smaller than the width $W_{4A}$ of the fourth area 604A. The width $W_{6A}$ of the second bending part 606A is smaller than the width $W_{1A}$ of the first area 601A, smaller than the width $W_{2A}$ of the second area 602A, smaller than the width $W_{3A}$ of the third area 603A and smaller than the width $W_{4A}$ of the fourth area 604A. The width $W_{7A}$ of the third bending part 607A is smaller than the width $W_{1A}$ of the first area 601A, smaller than the width $W_{2A}$ of the second area 602A, smaller than the width $W_{3A}$ of the third area 603A and smaller than the width $W_{4A}$ of the fourth area 604A. When the substrate 60A is bent, the first bending part 605A, the second bending part 606A and the third bending part 607A are used as bending parts. The control unit 10 is disposed on the first side at the fourth area 604A. The fingerprint sensing unit 20 is disposed on the first side at the second area 602A. The vibration unit 30 is disposed on the first side at the first area 601A. The switch 40 is disposed on the first side at the third area 603A. With reference to FIG. 14A, the first bending part 605A is bent so that the vibration unit 30 is overlapped and disposed under the fingerprint sensing unit 20 in the axial direction. The second bending part 606A is bent so that the switch 40 is overlapped and disposed under the vibration unit 30 in the axial direction. Further, the third bending part 607A is bent so that the control unit 10 is overlapped and disposed under the vibration unit 30, the fingerprint sensing unit 20 and the switch 40 to reduce the occupied space.

Figure 15:
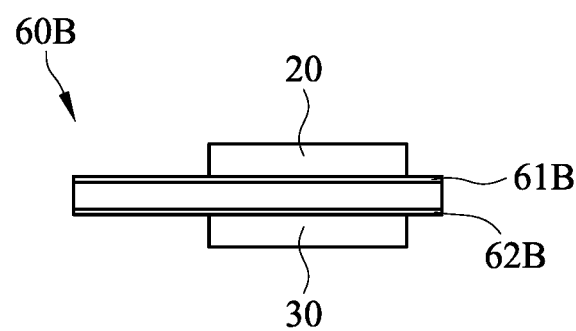
FIG. 15 is a side view of a third embodiment of a fingerprint sensing module in accordance with the present invention.

In one embodiment as shown in FIG. 15 in view of FIG. 4, the fingerprint sensing unit 20 and the vibration unit 30 are mounted on different sides of a substrate 60B. The control unit 10 is mounted separately on another circuit board or another substrate (not shown). A first circuit layer 61B and a second circuit layer 62B are disposed on the substrate 60B. The first circuit layer 61B electrically connects to the fingerprint sensing unit 20 and the control unit 10. The second circuit layer 62B electrically connects to the vibration unit 30 and the control unit 10.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A button module with a vibration feedback and a fingerprint sensing function, comprising:
   a control unit;
   a fingerprint sensing unit electrically connecting to the control unit;
   a vibration unit electrically connecting to the control unit and disposed under the fingerprint sensing unit, wherein the fingerprint sensing unit and the vibration unit disposed on a first side of a substrate, the substrate is a flexible printed circuit board, and the substrate is bent to dispose the vibration unit under the fingerprint sensing unit;
   a switch disposed under the vibration unit; and
   a keycap covering on the fingerprint sensing unit;

a switch disposed under the vibration unit; and
a keycap covering on the fingerprint sensing unit.

2. The button module as claimed in claim 1, wherein
the substrate has a first area, a second area and a bending part formed between the first area and the second area;
the vibration unit is disposed at the first area;
the fingerprint is disposed at the second area; and
the bending part is bent so that the vibration unit is disposed under the fingerprint sensing unit.

3. The button module as claimed in claim 2, wherein
the substrate has a second side opposing to the first side;
a first circuit layer is disposed on the first side;
a second circuit layer is disposed on the second side;
the fingerprint sensing unit electrically connects to the control unit through the first circuit layer; and
the vibration unit electrically connects to the control unit through the second circuit layer.

4. The button module as claimed in claim 3, wherein a supporting panel is disposed between the fingerprint sensing unit and the vibration unit when the substrate is bent.

5. The button module as claimed in claim 1, wherein the control unit is disposed on the substrate.

6. The button module as claimed in claim 1, wherein the vibration unit is a piezoelectric element to provide a vibration up and down along an axial direction in which axis that the vibration unit and the fingerprint sensing unit are stacked.

7. A fingerprint sensing module applying for a button module, comprising:
a control unit;
a fingerprint sensing unit electrically connecting to the control unit; and
a vibration unit electrically connecting to the control unit and disposed under the fingerprint sensing unit, wherein the fingerprint sensing unit and the vibration unit disposed on a first side of a substrate, the substrate is a flexible printed circuit board, and the substrate is bent to dispose the vibration unit under the fingerprint sensing unit.

8. The fingerprint sensing module as claimed in claim 7, wherein
the substrate has a first area, a second area and a bending part formed between the first area and the second area;
the vibration unit is disposed at the first area;
the fingerprint is disposed at the second area; and
the bending part is bent so that the vibration unit is disposed under the fingerprint sensing unit.

9. The fingerprint sensing module as claimed in claim 8, wherein
the substrate has a second side opposing to the first side;
a first circuit layer is disposed on the first side;
a second circuit layer is disposed on the second side;
the fingerprint sensing unit electrically connects to the control unit through the first circuit layer; and
the vibration unit electrically connects to the control unit through the second circuit layer.

10. The fingerprint sensing module as claimed in claim 9, wherein a supporting panel is disposed between the fingerprint sensing unit and the vibration unit when the substrate is bent.

11. The fingerprint sensing module as claimed in claim 7, wherein the control unit is disposed on the substrate.

12. The fingerprint sensing module as claimed in claim 7, wherein the vibration unit is a piezoelectric element to provide a vibration up and down along an axial direction in which axis that the vibration unit and the fingerprint sensing unit are stacked.

* * * * *